Figure 1:
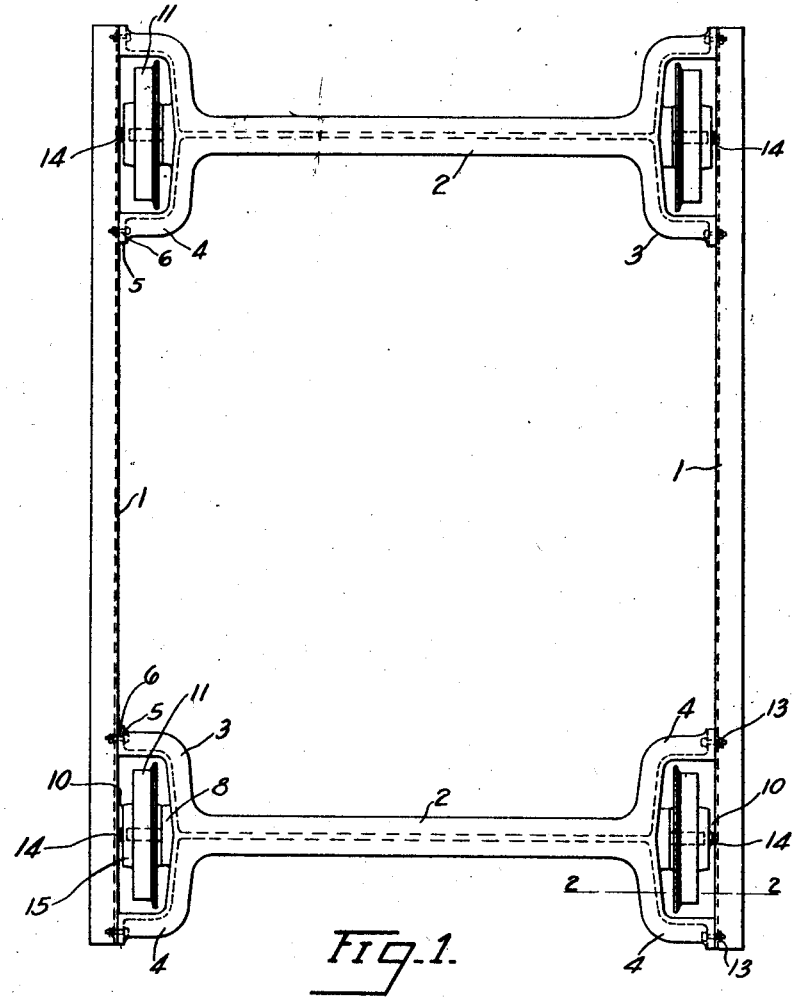

Jan. 8, 1929.　　　　　　　　　　　　　　　　1,698,248
O. TWEIT

TRUCK

Filed June 25, 1927

Olar Tweit
INVENTOR

BY *James B. Omni*
ATTORNEY

Patented Jan. 8, 1929.

1,698,248

UNITED STATES PATENT OFFICE.

OLAV TWEIT, OF ORANGE, NEW JERSEY, ASSIGNOR TO SEMET-SOLVAY ENGINEERING CORPORATION, OF NEW YORK, N. Y., A CORPORATION OF NEW YORK.

TRUCK.

Application filed June 25, 1927. Serial No. 201,519.

This invention relates to a vehicle frame including wheels therefor and particularly to a truck frame construction having end bars cast in finished form adapted to be fastened to side bars to form the frame.

An object of my invention is to provide a vehicle frame including wheels therefor, that is simple in construction, efficient in operation, and that can be constructed at a greatly reduced expense.

Although I have shown and described herein, as an embodiment of my invention, a truck, it will be understood that the invention is not limited to a truck but may be used in constructing other vehicles, such as mine-cars and other rolling stock.

In the manufacture of trucks it has heretofore been the practice to mount the wheels on long axles extending across the truck frame composed of side and end bars braced by transverse bars, and to key or otherwise fasten the wheels on the ends of the axles so that the axles would turn with the wheels. Occasionally, the wheels were loosely mounted on the axles which were provided with suitable retaining means to maintain the wheels rotatable thereon. These constructions are involved in that they require a number of parts which must be tediously fastened together to construct the truck, thus greatly increasing the cost thereof.

By my invention, the axles extending across the frame, the transverse bracing bars and the retaining means for the wheels are eliminated. Accordingly the end bars are cast with substantially U-shaped portions at the ends thereof, a bearing surface intermediate the arms of the U-shaped portion and axles extending from the bearing surface; wheels are mounted on the axles and thereafter the end bars are fastened to the side channel bars confining the wheels between the side channels and the U-shaped portions of the end bars. It is, of course, understood that the term "U-shaped" is intended to include any shape, curved or rectangular, which together with a cooperating surface, forms an enclosure.

My invention accordingly comprises a vehicle frame construction including a bar provided with a substantially U-shaped portion at one end thereof and having an axle intermediate the arms of said U-shaped portion.

Figure 3:
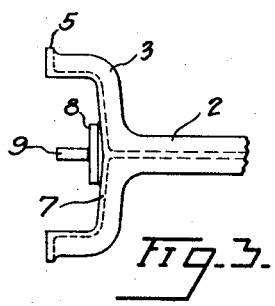
Figure 2:
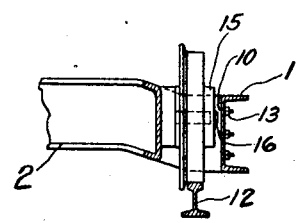
Figure 4:
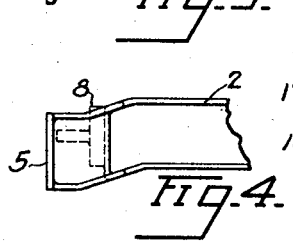
Figure 5:
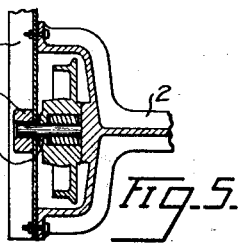

Other objects and advantages will appear from the following detailed description taken in connection with the accompanying drawing in which Fig. 1 is a plan view of a truck illustrating an embodiment of the invention; Fig. 2 is a fragmentary vertical elevation partly in section, along the line 2—2 of Fig. 1; Fig. 3 is a fragmentary plan of an end bar showing the U-shaped portion and the axle formed integral therewith; Fig. 4 is a fragmentary end elevation corresponding to Fig. 3 and Fig. 5 is a plan view of a detail, partly in section, illustrating a modified form of my invention.

In the preferred embodiment of the invention illustrated on the drawings 1—1 indicates the usual side channel bars of sufficient length to constitute the sides of the truck frame. The end of cross frame members or I bars 2—2 are preferably cast but may be otherwise formed with substantially U-shaped portions 3—3, the arms 4 of the U having integral therewith flat ends 5 provided with bolt holes 6. The mid portions 7 of each U is formed with a bearing portion 8 and integral therewith are the axles 9 which preferably extend from the bearings 8, a distance somewhat less than the length of arms 4 so that a clearance 10 is provided between the extremity of the axle and the channel bar 1 when the side and end bars are fastened together as will be hereinafter more fully explained. In practice it has been found economical and convenient to cast these end bars with the U-shaped portions having the bearings 8, axles 9, and the flat ends 5 in one operation.

The wheels 11 which may be adapted to run on rails 12 (Fig. 2) or may be the usual standard wheels used on hand or other trucks, are mounted on axles 9 and thereafter the end bars 2 bolted to the side bars 1 by bolts and nuts 13 or these bars may be otherwise fastened together. If desired the ends 5 may be machined prior to connection to the side bars so that a tight and smooth engagement is obtained between the side and end bars.

Referring to Figs. 1 and 2 it will be noted that the wheels 11 are confined between the bearing surface 8 and the side channel bars, being rotatably maintained in position on the axle without the use of additional retaining members. Preferably there is provided a projecting bearing portion 14 on each wheel limiting the longitudinal movement of the wheel on the axle by taking up a portion of the clearance between the end face 15 and the side channel bar 1 as indicated at 16, Fig. 2.

In the modification shown in Fig. 5 the axles 9 instead of extending from the bearings 8 a distance somewhat less than the length of the arms 4, extend into contact with the side channel bars 1 and are mounted, in bearings 17 on the side bars. The wheels 11 are provided with hubs or openings 18 and are confined between the bearing surface 8 and the side channel bars 1 as described in connection with Figs. 1 to 4 inclusive. This construction in addition to retaining the advantages hereinbefore enumerated is stronger and more rugged in that the axles are supported at both ends.

It will be noted that the truck hereinbefore described is simple in construction, efficient and durable in operation, eliminates the use of transverse bracing bars, axles extending across the frame and special retaining members for the wheels, and may be readily manufactured at a comparatively small cost.

It will of course be understood that while a specific embodiment of the invention has been shown and described, various changes in the details thereof may be made by those skilled in the art, and this invention is not to be limited to the structure disclosed, but only by the scope of the appended claims.

What is claimed is:

1. A vehicle frame comprising a bar provided with a substantially U-shaped portion at one end thereof, having an axle extending between the arms of said U-shaped portion substantially parallel thereto and one end of said axle being secured to the intermediate portion of said U-shaped portion.

2. A vehicle frame comprising a bar formed with substantially U-shaped portions at the ends thereof and having axle integral therewith and located intermediate the arms of the U-shaped portions.

3. A vehicle frame comprising a bar cast with substantially U-shaped portions at the ends thereof and having axles cast integral therewith, said axles being located intermediate the arms of the U-shaped portions.

4. A vehicle frame comprising a bar cast with substantially U-shaped portions at the ends thereof, having bearing surfaces cast at substantially the mid points of said U-shaped portions and formed with axles cast integral with and extending from said bearing surfaces.

5. A truck comprising end bars having substantially U-shaped portions at the ends thereof, axles intermediate the arms of said U-shaped portions, wheels on said axles and side channel bars connected to said end bars.

6. A truck comprising side channel bars, end bars having substantially U-shaped portions at the ends thereof, axles intermediate the arms of said U-shaped portions, wheels on said axles and means for fastening the arms of the U-shaped portions to the side channel bars.

7. A truck comprising side channel bars, end bars cast with substantially U-shaped portions at the ends thereof, bearing surfaces cast integral with and intermediate the arms of said U-shaped portions, axles cast integral with said bearing surfaces of length substantially less than that of said arms, said arms being cast with flat ends, wheels loosely and rotatably mounted on said axles and means for clamping said ends to the side channel bars whereby the wheels are confined between the side channel bars and the substantially U-shaped portions of the end bars.

In witness whereof, I have hereunto set my hand.

OLAV TWEIT.